(12) United States Patent
Iso

(10) Patent No.: US 10,346,742 B2
(45) Date of Patent: Jul. 9, 2019

(54) CALCULATION DEVICE, CALCULATION METHOD, AND RECORDING MEDIUM

(71) Applicant: YAHOO JAPAN CORPORATION, Tokyo (JP)

(72) Inventor: Ken-ichi Iso, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 1302 days.

(21) Appl. No.: 14/465,147

(22) Filed: Aug. 21, 2014

(65) Prior Publication Data

US 2015/0371149 A1 Dec. 24, 2015

(30) Foreign Application Priority Data

Jun. 19, 2014 (JP) .................................. 2014-126546

(51) Int. Cl.
*G06N 3/08* (2006.01)
*G06N 3/04* (2006.01)

(52) U.S. Cl.
CPC .......... *G06N 3/084* (2013.01); *G06N 3/0454* (2013.01)

(58) Field of Classification Search
None
See application file for complete search history.

(56) References Cited

U.S. PATENT DOCUMENTS

| | | | |
|---|---|---|---|
| 5,276,771 A | 1/1994 | Manukian et al. | |
| 6,513,023 B1 * | 1/2003 | Duong | G06N 3/063 706/26 |
| 7,213,008 B2 * | 5/2007 | Rising, III | G06F 17/148 706/15 |
| 2015/0371133 A1 * | 12/2015 | Iso | G06N 3/0454 706/16 |
| 2015/0371149 A1 * | 12/2015 | Iso | G06N 3/0454 706/12 |

FOREIGN PATENT DOCUMENTS

| | | | | |
|---|---|---|---|---|
| EP | 0521729 A2 * | 1/1993 | | G06N 3/04 |
| EP | 1854984 A1 * | 11/2007 | | F02D 41/1405 |
| JP | 05246633 A * | 9/1993 | | |
| JP | H05-246633 A | 9/1993 | | |

(Continued)

OTHER PUBLICATIONS

Oct. 20, 2015 Office Action issued in Japanese Patent Application No. 2014-126546.

*Primary Examiner* — Paulinho E Smith
(74) *Attorney, Agent, or Firm* — Oliff PLC

(57) ABSTRACT

A calculation device includes an adding unit configured to add at least one new node to a network, which has multiple nodes that output results of calculations on input data are connected and which learned a feature of data belonging to a first subclass contained in a predetermined class. The calculation device includes an accepting unit configured to accept, as input data, training data belonging to a second subclass contained in the predetermined class. The calculation device includes a calculation unit configured to calculate coupling coefficients between the new node added by the adding unit and other nodes to learn a feature of the training data belonging to the second subclass based on an output result obtained when the training data accepted by the accepting unit is input to the network.

8 Claims, 4 Drawing Sheets

(56) References Cited

FOREIGN PATENT DOCUMENTS

| | | | | | |
|---|---|---|---|---|---|
| JP | H07-502357 A | | 3/1995 | | |
| JP | 07160660 A | * | 6/1995 | | |
| JP | 09062664 A | * | 3/1997 | ............. | G06F 15/18 |
| JP | H09-062644 A | | 3/1997 | | |
| JP | A-2009-516246 | | 4/2009 | | |
| JP | 2012-014617 | * | 1/2012 | ............... | G06N 3/04 |
| JP | 2012-014617 A | | 1/2012 | | |
| WO | WO 2007/056803 A1 | | 5/2007 | | |

* cited by examiner

FIG.3

| NEURON ID | TO-BE-COUPLED NEURON ID | COUPLING COEFFICIENT | ... |
|---|---|---|---|
| $N_{01}$ | $N_{11}$ | $W_0$ | |
| | ... | ... | |
| ... | ... | ... | |
| $N_{11}$ | $N_{21}$ | $W_A$ | |
| | $N_{22}$ | $W_B$ | |
| ... | ... | ... | |
| $N_{21}$ | $N_{n1}$ | $W_C$ | |
| | $N_{n2}$ | $W_D$ | |
| | $N_{n3}$ | $W_E$ | |
| ... | ... | ... | ... |
| $N_p$ | $N_{11}$ | $W_{11}$ | |
| | $N_{12}$ | $W_{12}$ | |
| | $N_{13}$ | $W_{13}$ | |
| | $N_{21}$ | $W_{21}$ | |
| | $N_{22}$ | $W_{22}$ | |
| | $N_{n1}$ | $W_{n1}$ | |
| | $N_{n2}$ | $W_{n2}$ | |
| | $N_{n3}$ | $W_{n3}$ | |
| | $N_f$ | $W_f$ | |
| ... | ... | ... | |

121

CALCULATION DEVICE, CALCULATION METHOD, AND RECORDING MEDIUM

CROSS-REFERENCE TO RELATED APPLICATIONS

The present application claims priority to and incorporates by reference the entire contents of Japanese Patent Application No. 2014-126546 filed in Japan on Jun. 19, 2014.

BACKGROUND OF THE INVENTION

1. Field of the Invention

The present invention relates to a calculation device, a calculation method, and a recording medium.

2. Description of the Related Art

In recent years, there is a known technique related to deep leaning for performing learning for language recognition or image recognition by using a deep neural networks (DNN) including neurons that are connected in a multistage manner. For example, in such a technique, a DNN is acquired by learning an object or the like contained in an image of input image data. If new image data is input, what object is contained in an image is discriminated on the basis of the acquired DNN.

Patent Document 1: Japanese Laid-open Patent Publication No. 2009-516246

However, in the above described conventional technique, it is not always possible to easily acquire a DNN. For example, in the above described conventional technique, to acquire a DNN that performs desired determination, learning is performed by using large amounts of data. Therefore, in the above described conventional technique, more effort is needed to collect pieces of training data and more time is needed to learn data. Under such circumstances, in the above described conventional technique, it is not always possible to easily acquire a DNN.

SUMMARY OF THE INVENTION

It is an object of the present invention to at least partially solve the problems in the conventional technology. A calculation device comprising: an adding unit configured to add at least one new node to a network, which has multiple nodes that output results of calculations on input data are connected and which learned a feature of data belonging to a first subclass contained in a predetermined class; an accepting unit configured to accept, as input data, training data belonging to a second subclass contained in the predetermined class; and a calculation unit configured to calculate coupling coefficients between the new node added by the adding unit and other nodes to learn a feature of the training data belonging to the second subclass based on an output result obtained when the training data accepted by the accepting unit is input to the network.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of a DNN information storage unit according to the embodiment;

DETAILED DESCRIPTION OF THE PREFERRED EMBODIMENTS

Figure 1:
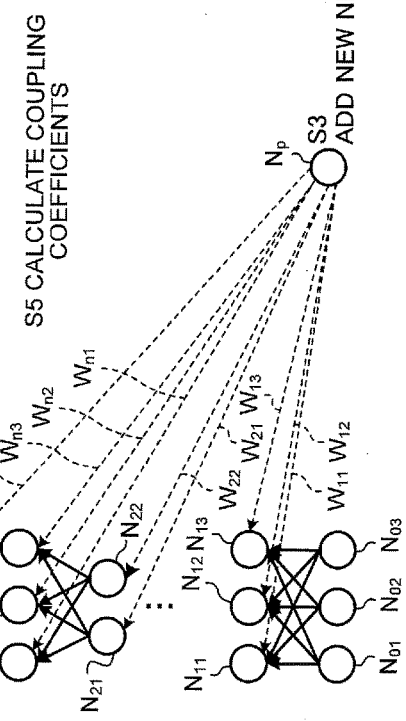
FIG. 1 is an explanatory diagram illustrating an example of a calculation process performed by a calculation device according to an embodiment.
Figure 1:
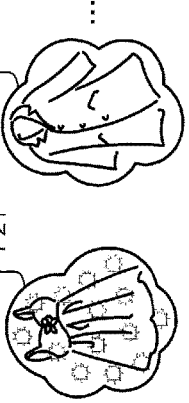
Figure 1:
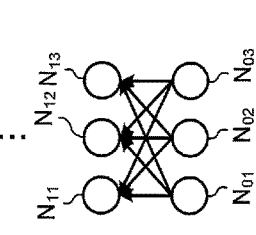
Figure 1:
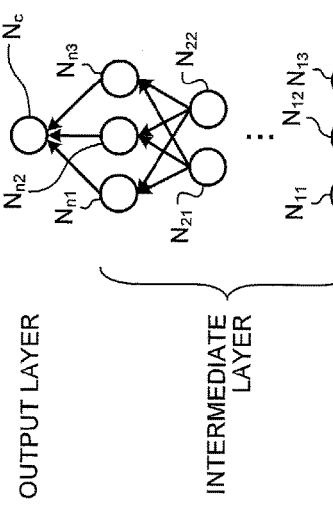
Figure 1:
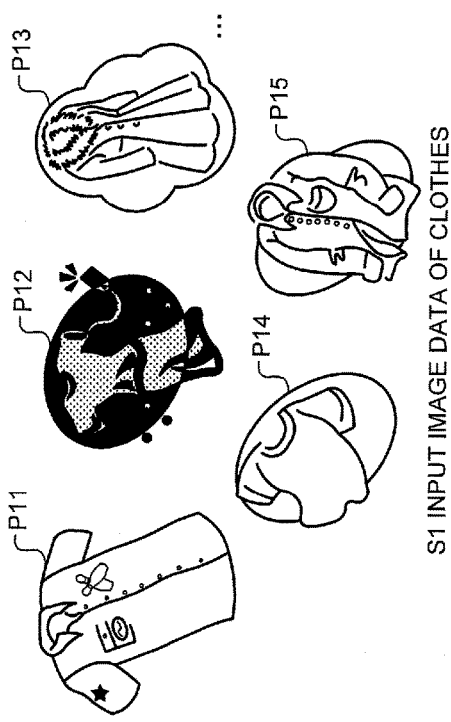

Hereinafter, modes (hereinafter, referred to as "embodiments") for carrying out a calculation device, a calculation method, and a recording medium according to the present invention will be described in detail with reference to drawings. The calculation device, the calculation method, and the recording medium according to the present invention are not limited by the embodiments. Further, in the following embodiments, the same components are denoted by the same reference numerals and symbols, and the same explanation will be omitted.

1. Calculation Process

First, with reference to FIG. 1, an example of a calculation process according to an embodiment will be described. FIG. 1 is an explanatory diagram illustrating an example of a calculation process performed by a calculation device according to the embodiment. In the example in FIG. 1, a case is described in which a calculation device 100 performs a calculation process of calculating coupling coefficients of a DNN capable of discriminating a feature of data.

The calculation device 100 is a server device that calculates coupling coefficients (for example, weight coefficients) between nodes (for example, neurons). The DNN is, for example, a network, which has multiple neurons that output results of calculations on input data are connected and in which coupling coefficients for extracting a feature of data belonging to a predetermined class are set between the multiple neurons. In the example in FIG. 1, the DNN includes an input layer formed of neurons $N_{01}$ to $N_{03}$, an intermediate layer formed of neurons $N_{11}$ to $N_{n3}$, and an output layer formed of a neuron $N_C$. Further, the DNN is a learning device that extracts an image containing clothes manufactured by an A company (corresponding to a first subclass) from among images in which clothes (corresponding to a predetermined class) are drawn. The neuron $N_C$ outputs "1" when an image contains the clothes manufactured by the A company. On the contrary, the neuron $N_C$ outputs "0" when an image does not contain the clothes manufactured by the A company. Furthermore, in FIG. 1, neuron groups of three layers are illustrated as an example of the intermediate layer of the DNN for simplicity of explanation; however, the intermediate layer of the DNN is formed of an arbitrary number of layers.

The calculation device 100, for example, calculates coupling coefficients between a neuron added to the DNN and other neurons in order to extract a feature of data. This will be described in detail with reference to FIG. 1. In the example in FIG. 1, the calculation device 100 calculates coupling coefficients of a DNN that extracts a feature of clothes manufactured by a C company (corresponding to a second subclass).

First, the calculation device 100 learns the clothes manufactured by the A company. For example, as illustrated in FIG. 1, the calculation device 100 accepts, as pieces of input data, multiple pieces of image data P11 to P15 in which the clothes manufactured by the A company are drawn (Step S1). In FIG. 1, for simplicity of explanation, an example is illustrated in which the calculation device 100 accepts five pieces of input data; however, in reality, it accepts, as the pieces of the input data, an adequate number of pieces of image data to learn a feature of the clothes manufactured by the A company.

Then, the calculation device 100 generates a DNN, in which coupling coefficients for extracting the feature of the data are set between the multiple neurons $N_{01}$ to $N_{n3}$, by using the accepted pieces of the image data. For example, the calculation device 100 corrects the coupling coefficients between the neurons such that an error between input data and output data of the DNN is reduced. Consequently, the calculation device 100 calculates a DNN capable of discriminating image data containing the clothes manufactured by the A company from among pieces of image data in which various clothes is drawn (Step S2). In this case, the output layer contains only one neuron that is the neuron $N_C$, and learns to output "1" if an image contains the clothes manufactured by the A company and to output "0" if an image does not contain the clothes manufactured by the A company. Further, it is possible to provide, as an output layer, neurons representing respective categories of clothes (coat, business suit, sweater, shirt, pants, socks, and the like) and use a DNN that discriminates the categories of clothes. Alternatively, it may be possible to provide, as an output layer, neurons corresponding to pixels of an image in the same manner as in the input layer, and learn to reproduce the same image as an input image (in this case, reproduction can be performed with high accuracy if an image containing clothes is input, but reproduction of an input image is not performed with high accuracy in the output layer if other images, such as images of vehicles, that have not been learned are input). Meanwhile, the calculation device 100 may generate a DNN that learned the feature of the clothes manufactured by the A company by using a method other than the above described method. Further, the calculation device 100 may acquire and use a DNN that is generated by a different server device or the like and that learned the feature of the clothes manufactured by the A company, without performing the above described learning process. In the following description, the DNN generated at Step S2 may be described as a trained DNN.

Thereafter, the calculation device 100 newly adds a new neuron Np to a DNN capable of distinguishing that an image contains the clothes manufactured by the A company (Step S3). Hereinafter, the DNN to which the new neuron Np is added may be described as a processing target DNN. Incidentally, a neuron $N_f$ outputs "1" if an image input as input data contains the clothes manufactured by the C company. On the contrary, the neuron $N_f$ outputs "0" if an image input as input data does not contain the clothes manufactured by the C company. Subsequently, the calculation device 100 accepts pieces of image data P21 and P22, in which the clothes manufactured by the C company are drawn, as pieces of training input data (Step S4). In FIG. 1, for simplicity of explanation, an example is illustrated in which the calculation device 100 accepts the image data P21 and the image data P22 as the pieces of the input data; however, in reality, it accepts, as the pieces of the input data, an adequate number of pieces of image data to learn a feature of the clothes manufactured by the C company.

The calculation device 100 calculates coupling coefficients between the added new neuron Np and other neurons based on an output result obtained when the accepted image data P21 (an image of the clothes manufactured by the C company) is input to the processing target DNN (Step S5). That is, the calculation device 100 adjusts the coupling coefficients of the DNN to discriminate the clothes manufactured by the C company. Specifically, the calculation device 100 sets coupling coefficient between the neurons $N_{01}$ to $N_{n3}$ and $N_f$ to fixed values, and corrects coupling coefficients between the new neuron Np and the other neurons $N_{11}$ to $N_{n3}$ and $N_f$ by a backpropagation method (error correction method).

For example, the calculation device 100 inputs the image data P21 to the processing target DNN. In this case, the processing target DNN is not designed to determine the clothes manufactured by the C company, and may provide, as an output result, a wrong output without outputting "the clothes manufactured by the C company". As one example, the neuron $N_f$ may output "0" indicating that "the clothes manufactured by the C company" is not drawn in an image even when the image data P21 in which "the clothes manufactured by the C company" is drawn is input. Therefore, the calculation device 100, to eliminate an error of a wrong output with respect to the input data, calculates coupling coefficients other than the coupling coefficients of the trained DNN among coupling coefficients contained in the processing target DNN, that is, calculates the coupling coefficients between the new neuron Np and the other neurons.

In this case, in the processing target DNN, at least the feature of the clothes manufactured by the A company is learned in the range of the trained DNN. Therefore, the calculation device 100 adds the new neuron Np to the trained DNN that learned the feature of the clothes manufactured by the A company, and calculates the coupling coefficients between the new neuron Np and the other neurons $N_{11}$ to $N_{n3}$ and $N_f$ so as to determine the clothes manufactured by the C company.

Specifically, the calculation device 100 calculates coupling coefficients such that an error between an output result obtained when the input data is input to the DNN and a correct output result with respect to the input data is minimized. As one example, when multiple pieces of image data in which the clothes manufactured by the C company are drawn are input as pieces of input data, the calculation device 100 calculates the coupling coefficients so as to output "the clothes manufactured by the C company" as output results with respect to as many pieces of image data as possible. More specifically, when image data in which the clothes manufactured by the C company is drawn is input as input data, the calculation device 100 calculates the coupling coefficients such that the neuron $N_f$ outputs "1". That is, the calculation device 100 corrects the coupling coefficients such that an error in discriminating the clothes manufactured by the C company is minimized.

Further, the calculation device 100 calculates coupling coefficient $W_{11}$ to $W_{n3}$ and $W_f$ between the new neuron Np and the upper-stage neurons $N_{11}$ to $N_{n3}$ and $N_f$, which are located in the output layer side relative to a layer to which the new neuron Np is added among the neurons $N_{01}$ to $N_{n3}$ and $N_f$. More specifically, for example, the calculation device 100 calculates coupling coefficients between the new neuron Np and the other neurons $N_{11}$ to $N_{n3}$ and $N_f$, the coupling coefficients $W_{11}$ to $W_{n3}$ and $W_f$ that minimize an error, in order from a coupling coefficient between neurons located close to the output layer among the neurons contained in the DNN. That is, in the example in FIG. 1, the calculation device 100 calculates the coupling coefficients that minimize an error in order of the coupling coefficients $W_f$, $W_{n1}$, $W_{n2}$, $W_{n3}$, ... $W_{21}$, $W_{22}$, $W_{11}$, $W_{12}$, $W_{13}$. Therefore, the calculation device 100 can acquire a DNN in which the accuracy in discriminating the clothes manufactured by the C company is improved, that is, a DNN adjusted for the clothes manufactured by the C company.

Further, if the processing target DNN erroneously outputs "the clothes manufactured by the C company" as an output result with respect to input data in which the clothes manufactured by the C company is not drawn (for example, image data in which clothes manufactured by an X company is drawn), the calculation device 100 calculates the coupling coefficients-so as not to output "the clothes manufactured by the C company" as output results with respect to as many pieces of image data as possible. For example, when image data in which the clothes manufactured by the X company is drawn is input as input data, the calculation device 100 calculates the coupling coefficients such that the neuron $N_f$ outputs "0". Meanwhile, it is possible to calculate coupling coefficients for discriminating the clothes manufactured by the X company by inputting the image data in which the clothes manufactured by the X company to the same DNN and by correcting only the coupling coefficients between the new neuron Np and the other neurons $N_{11}$ to $N_{n3}$ and $N_f$.

Then, the calculation device 100 generates a DNN that discriminates "the clothes manufactured by the C company" based on the calculated coupling coefficients (Step S6). That is, the calculation device 100 generates a DNN in which the coupling coefficients $W_f$, $W_{n1}$, $W_{n2}$, $W_{n3}$, ... $W_{21}$, $W_{22}$, $W_{11}$, $W_{12}$, $W_{13}$ are set to the calculated values. Meanwhile, the calculation device 100 may acquire the calculated coupling coefficients, that is, the coupling coefficients between the neurons $N_{11}$ to $N_{n3}$ and $N_f$ and the new neuron Np, as vector indicating a feature amount of data. The vector may be used as data for classifying input data for example. Therefore, the calculation device 100 may extract the calculated coupling coefficients as the feature amounts of an image in which the clothes manufactured by the C company is drawn.

In this manner, the calculation device 100 according to the embodiment adds a new node to a network, which has multiple nodes that output results of calculations on input data are connected and which learned a feature of data belonging to the first subclass (for example, "the clothes manufactured by the A company") contained in a predetermined class (for example, a class of "clothes"). Further, the calculation device 100 accepts, as new data and as input data, data belonging to the second subclass in the predetermined class (for example, "the clothes manufactured by the C company" contained in the class of "clothes"). Furthermore, the calculation device 100 calculates coupling coefficients between the added new node and other nodes to learn a feature of the new data, that is, a feature of the second subclass, based on an output result obtained when the accepted new data is input to the network.

Moreover, the calculation device 100 according to the embodiment calculates coupling coefficient that minimize an error between an output result obtained when the new data is input to the network and a correct output result with respect to the new data.

Furthermore, the calculation device 100 according to the embodiment calculates the coupling coefficients between the added new node and the other nodes, coupling coefficients that minimize an error in order from a coupling coefficient with respect to a node located closest to the output layer among the nodes contained in the network.

Therefore, the calculation device 100 can easily acquire a DNN that extracts a feature of new data, by using an existing DNN. That is, the calculation device 100 can adjust an existing DNN so as to extract a feature of new data. For example, the calculation device 100 can acquire a DNN capable of discriminating the feature of the clothes manufactured by the C company, by using the DNN that learned the feature of the clothes manufactured by the A company; therefore, it is possible to easily acquire the DNN capable of discriminating the feature of the clothes manufactured by the C company as compared to a case where such a DNN is newly generated.

Further, the calculation device 100 uses a DNN that learned a predetermined feature; therefore, it is possible to acquire the DNN with a smaller number of pieces of image data for learning other features as compared to a case where the DNN is newly generated. Therefore, the calculation device 100 can reduce effort to collect pieces of training data and reduce time to learn data.

In another example, the calculation device 100 can improve determination accuracy by adjusting coupling coefficients between neurons. For example, the calculation device 100, after learning a feature by using image data in which an object is clearly drawn, adjusts coupling coefficients between neurons by using image data in which an object is not clearly drawn. Therefore, the calculation device 100 can determine an object of image data even when the object is clear or blurred.

Incidentally, the calculation device 100 may generate a DNN capable of discriminating between features of the clothes manufactured by the A company, clothes manufactured by a B company, and the clothes manufactured by the C company, rather than the feature of the clothes manufactured by the C company. In this case, the calculation device 100 adjusts the coupling coefficients between the neurons so as to discriminate between the features of the clothes manufactured by the A company, the clothes manufactured by the B company, and the clothes manufactured by the C company. Therefore, the calculation device 100 can generate a DNN capable of discriminating between clothes of multiple manufactures. Further, if the calculation device 100 adjusts the coupling coefficients between the neurons so as to discriminate only the feature of the clothes manufactured by the C company, it is possible to discriminate the clothes manufactured by the C company with high accuracy.

2. Configuration of Calculation Device

Figure 2:
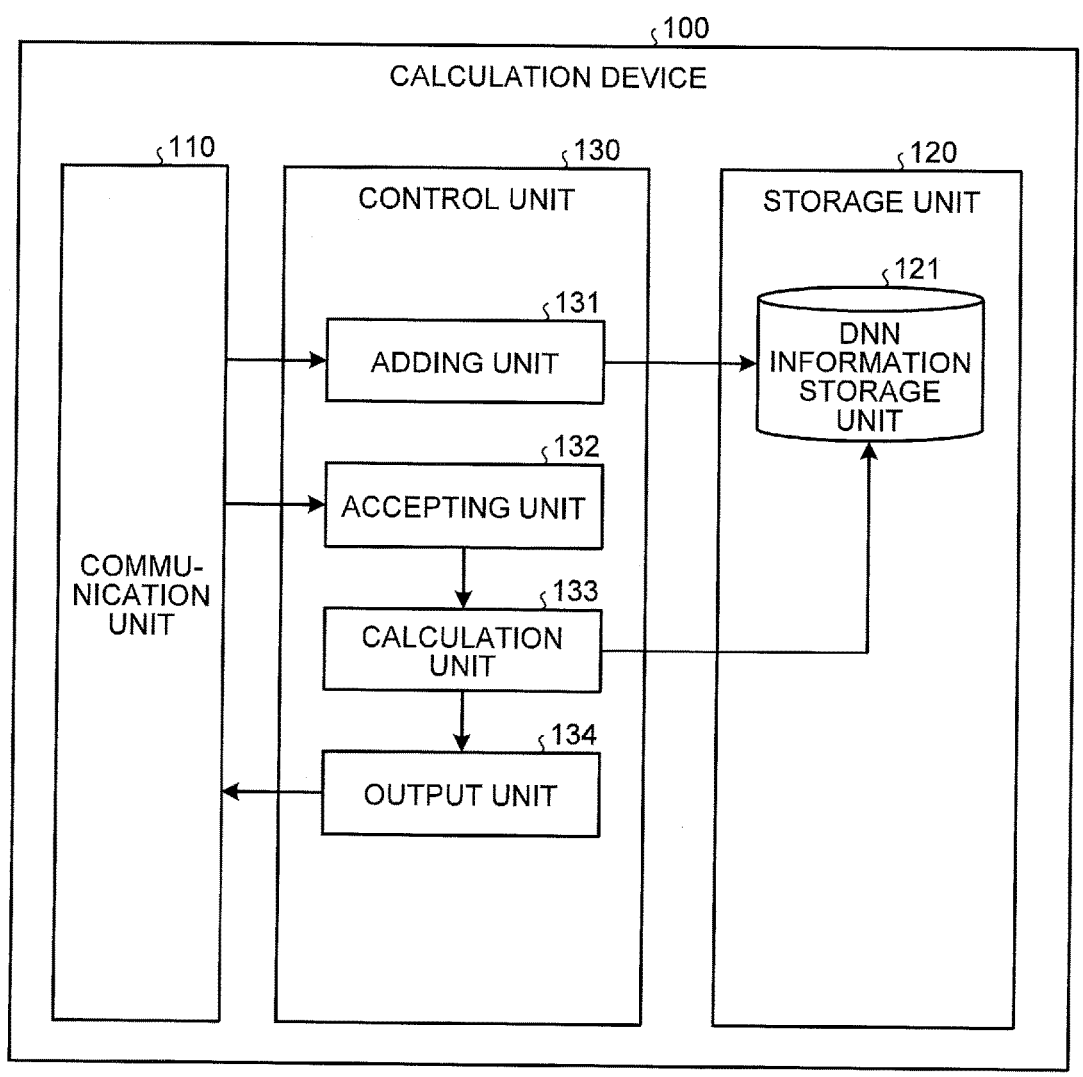
FIG. 2 is a diagram illustrating a configuration example of the calculation device according to the embodiment.

Next, with reference to FIG. 2, a configuration of the calculation device 100 according to the embodiment will be described. FIG. 2 is a diagram illustrating a configuration example of the calculation device 100 according to the embodiment. As illustrated in FIG. 2, the calculation device 100 includes a communication unit 110, a storage unit 120, and a control unit 130. The calculation device 100 may include an input unit (for example, a keyboard, a mouse, or the like) that accepts various operations from an administrator or the like who uses the calculation device 100, or a display unit (for example, a liquid crystal display or the like) for displaying various types of information.

Communication Unit 110

The communication unit 110 is realized by, for example, a NIC or the like. The communication unit 110 is connected to a network with or without wires, and transmits and receives information to and from various server devices, terminal devices, and nodes via the network.

Storage Unit 120

The storage unit 120 is realized by, for example, a semiconductor memory device such as a random access memory (RAM) or a flash memory, or a storage device such as a hard disk or an optical disk. The storage unit 120 includes a DNN information storage unit 121.

DNN Information Storage Unit 121

The DNN information storage unit 121 stores therein information on DNNs. Specifically, the DNN information storage unit 121 stores therein information on coupling coefficients between nodes contained in a DNN, for each node. For example, the DNN information storage unit 121 stores therein coupling coefficients between a newly-added new neuron and other neurons. FIG. 3 illustrates an example of the DNN information storage unit 121 according to the embodiment. As illustrated in FIG. 3, the DNN information storage unit 121 stores therein items of a "neuron ID", a "to-be-coupled neuron ID", a "coupling coefficient", and the like.

The "neuron ID" is identification information for identifying a neuron contained in a DNN. The "to-be-coupled neuron ID" is identification information for identifying a neuron to be coupled to a neuron corresponding to the "neuron ID". The "coupling coefficient" indicates a coupling coefficient between neurons. When a new neuron is added, an initial value that does not influence to a DNN is stored, as a coupling coefficient between the new neuron and a to-be-connected neuron, in the "coupling coefficient". For example, when a new neuron is added, "0" as an initial value is stored in the "coupling coefficient".

That is, in FIG. 3, an example is illustrated in which a coupling coefficient between the neuron $N_{11}$ corresponding to a neuron ID "$N_n$" and the neuron $N_{21}$ corresponding to a neuron ID "$N_{21}$" is "$W_A$". Further, in FIG. 3, an example is illustrated in which a coupling coefficient between the newly added neuron $N_P$ corresponding to a neuron ID "$N_P$" and the neuron $N_{21}$ corresponding to a neuron ID "$N_{21}$" is "$W_{21}$".

Control Unit 130

The control unit 130 is realized by, for example, causing a central processing unit (CPU), a micro processing unit (MPU), or the like to execute various programs (corresponding to an example of a calculation program) stored in a storage device inside the calculation device 100 by using a RAM as a work area. Further, the control unit 130 is realized by an integrated circuit, such as an application specific integrated circuit (ASIC) or a field programmable gate array (FPGA).

The control unit 130, as illustrated in FIG. 2, includes an adding unit 131, an accepting unit 132, a calculation unit 133, and an output unit 134, and implements or executes functions and operations of information processing described below. Meanwhile, the internal configuration of the control unit 130 is not limited to the configuration illustrated in FIG. 2, and other configurations are applicable as long as the calculation process to be described later is performed. Further, connection relations of the processing units of the control unit 130 are not limited to the connection relations illustrated in FIG. 2, and other connection relations are applicable.

Adding Unit 131

The adding unit 131 adds a new node to a DNN. Specifically, the adding unit 131 adds a new neuron to a network, which has multiple neurons that output results of calculations on input data are connected and in which coupling coefficients for extracting a feature of data belonging to a subclass contained in a predetermined class are set between the multiple neurons. For example, the adding unit 131 adds a new neuron to a neuron group of a DNN. In this example, the adding unit 131 stores, in the DNN information storage unit 121, initial values of "0" as the coupling coefficients between the new neuron and the other neurons.

Accepting Unit 132

The accepting unit 132 accepts input data. Specifically, the accepting unit 132 accepts training input data for learning a feature of a discrimination target. For example, the accepting unit 132 accepts, as the training input data, image data in which the discrimination target is drawn. As one example, if the DNN can discriminate the clothes manufactured by the A company, the accepting unit 132 accepts, as the training input data, image data in which the clothes manufactured by the C company is drawn.

Calculation Unit 133

The calculation unit 133 calculates coupling coefficients between nodes contained in a DNN. Specifically, the calculation unit 133 calculates the coupling coefficients between the new neuron added by the adding unit 131 and the other neurons, based on an output result obtained when the data accepted by the accepting unit 132 is input to the network. For example, the calculation unit 133 calculates the coupling coefficients between the new neuron and the other neurons by a backpropagation method.

As one example, the calculation unit 133 calculates the coupling coefficients between the new neuron and the other neurons so as to eliminate a wrong output result with respect to the input data. Specifically, the calculation unit 133 calculates the coupling coefficients that minimize an error between the output result obtained when the data accepted by the accepting unit 132 is input to the DNN and a correct output result with respect to the data. As one example, the calculation device 100 calculates the coupling coefficients so as to output correct output results with respect to as many pieces of input data as possible. That is, the calculation device 100 calculates the coupling coefficient so as to minimize a discrimination error with respect to the input data. Therefore, the calculation device 100 can reduce a prediction error in an output layer.

For example, the calculation unit 133 calculates, the coupling coefficients between the new neuron and the other neurons, that minimize an error, in order from a coupling coefficient with respect to a neuron located closest to the output layer among the neurons contained in the DNN. As one example, the calculation unit 133 calculates coupling coefficients between the new neuron and upper-stage neurons located in the output layer side relative to a layer to which the new neuron is added among other neurons.

Here, the calculation unit 133 calculates coupling coefficients between the new neurons added by the adding unit and the other neurons, that minimize the error, with stabilizing coupling coefficients between the other neurons other than the new neuron. This is because if the DNN changes the coupling coefficients between the other neurons other than the new neuron, time needed to learn a feature of newly input data may increase. In the example in FIG. 3, when the new neuron Np is added, the calculation unit 133 calculates only the coupling coefficients $N_{11}$ to $W_{n3}$ and $W_f$ with respect to the neurons $N_{11}$ to $N_{n3}$ and $N_f$. Then, the calculation unit 133 updates the coupling coefficients stored in the DNN information storage unit 121 with the calculated coupling coefficients.

Further, when a new node is added to a DNN that learned a predetermined feature, the calculation unit 133 adjusts coupling coefficients between neurons contained in the DNN so as to discriminate another feature (for example, a feature of data belonging to another subclass). For example, the calculation unit 133 corrects the coupling coefficients between the neurons by the backpropagation method. As one example, when a new neuron is added to a trained DNN capable of discriminating the clothes manufactured by the A company, the calculation unit 133 adjusts coupling coefficients between neurons contained in the DNN so as to discriminate a feature of the clothes manufactured by the C company. Consequently, the calculation device 100 can generate a DNN capable of discriminating a feature different from the learned feature.

Output Unit 134

The output unit 134 outputs a DNN. Specifically, the output unit 134 generates a DNN, which is acquired by adding a new neuron to a trained DNN and in which the coupling coefficients calculated by the calculation unit 133 are set, and outputs the generated DNN to a user terminal or the like used by a user. In the example in FIG. 2, although illustration is omitted, the calculation device 100 may transmit the generated DNN to a user terminal via a network N or the like for example.

3. Flow of Calculation Process

Figure 4:
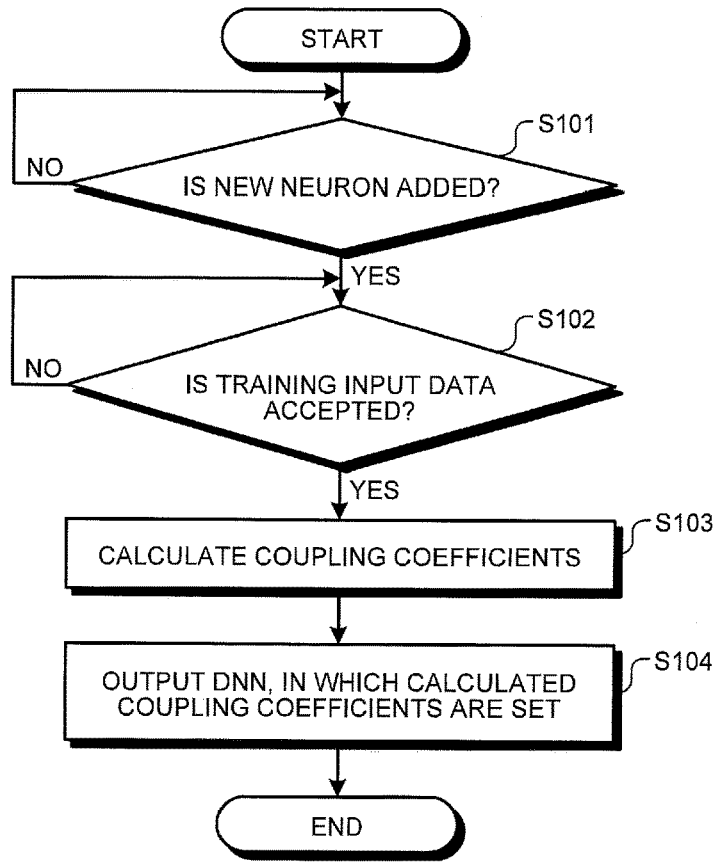
FIG. 4 is a flowchart illustrating the flow of the calculation process performed by the calculation device.

Next, with reference to FIG. 4, the flow of the calculation process performed by the calculation device 100 according to the embodiment will be described. FIG. 4 is a flowchart illustrating the flow of the calculation process performed by the calculation device 100 according to the embodiment.

As illustrated in FIG. 4, the calculation device 100 adds a new neuron to a DNN, which has multiple neurons that output results of calculations on input data are connected and in which coupling coefficients for extracting a feature of data belonging to the first subclass contained in a predetermined class are set between the multiple neurons (Step S101). If a new neuron is not added to the DNN (Step S101; No), the calculation device 100 waits until a new neuron is added to the DNN.

On the contrary, if a new neuron is added (Step S101; Yes), the calculation device 100 accepts, as input data, training data belonging to the second subclass (Step S102). For example, the calculation device 100 accepts input data that intentionally causes an error to occur between an output result on the input data and a correct output result on the input data, and accepts input data that does not cause such an error to occur. If the training data is not accepted as the input data (Step S102; No), the calculation device 100 waits until accepting the training data as the input data.

On the contrary, when accepting the training data as the input data (Step S102; Yes), the calculation device 100 calculates coupling coefficients between the new neuron and other neurons, based on an output result obtained when the training data belonging to the second subclass is input to the DNN (Step S103). Specifically, the calculation device 100 calculates coupling coefficients that minimize an error between an output result obtained when the input data is input to the DNN and a correct output result with respect to the input data. As one example, the calculation device 100 calculates the coupling coefficients between the new neuron and the other neurons, coupling coefficients that minimize the error, in order from a coupling coefficient with respect to a neuron located closest to the output layer among the neurons contained in the DNN. For example, the calculation device 100 calculates coupling coefficients such between the new neuron added by the adding by the adding unit and the other neurons, that minimize the error, with stabilizing coupling coefficients between other neurons other than the new neuron.

Then, the calculation device 100 generates a DNN, which is acquired by adding the new neuron to the trained DNN and in which the coupling coefficients calculated by the calculation unit 133 are set, and outputs the generated DNN to a user terminal or the like used by a user (Step S104).

4. Modified Example

The calculation device 100 according to the above described embodiment may be embodied in various different forms other than the above described embodiment. Therefore, in the following, other embodiments of the above described calculation device 100 will be described.

4-1. Addition of New Neuron (1)

In the above described embodiment, an example has been described in which the calculation device 100 adds a new neuron to a network, which has multiple neurons that output results of calculations on input data are connected and in which coupling coefficients for extracting a feature of data belonging to the first subclass contained in the predetermined class are set between the multiple neurons. Meanwhile, the calculation device 100 may add at least one new neuron to a network while setting coupling coefficients between neurons contained in the network and the new neuron to arbitrary initial values.

Specifically, the calculation device 100 adds a new neuron to a network by setting coupling coefficients between neurons contained in the network and the new neuron to initial values that do not influence to an output result. For example, the calculation device 100 adds a new neuron to the network by setting the coupling coefficients between the neurons contained in the network and the new neuron to initial values of "0".

In this manner, the calculation device 100 adds a new neuron to a network by setting coupling coefficients between neurons contained in the network and the new neuron to initial values that do not influence to an output result. Therefore, the calculation device 100 can reduce the influence of addition of the new neuron; therefore, it is possible to calculate coupling coefficients according to an error in a wrong output result.

4-2. Addition of New Neuron (2)

In the above described embodiment, an example has been described in which the calculation device 100 adds a new neuron to an input layer of a DNN. Meanwhile, the calculation device 100 may add at least one new neuron to an arbitrary layer of a DNN, rather than to an input layer of the DNN.

For example, in the example in FIG. 1, the calculation device 100 may add the new neuron Np to an arbitrary layer, such as the input layer containing the neurons $N_{01}$ to $N_{03}$, the intermediate layer containing the neurons $N_{11}$ to $N_{n3}$, or the output layer containing the neuron $N_f$. The calculation device 100 may add the new neuron Np to a stage of an arbitrary neuron group among the neuron groups forming the intermediate layer.

In this manner, the calculation device 100 adds a new neuron to an arbitrary layer of a DNN, rather than to an input layer. Therefore, the calculation device 100 can acquire a wide variety of DNNs.

4-3. Addition of New Neuron (3)

In the above described embodiment, an example has been described in which the calculation device 100 adds a new neuron to a DNN. Meanwhile, the calculation device 100 may add at least one new neuron to an autoencoder.

Specifically, the calculation device 100 adds a new neuron to an autoencoder that is a DNN for outputting a high reproducibility of input data as an output result. For example, the calculation device 100 adds a new neuron to an autoencoder that performs operations of deleting the number of dimensions of input data and thereafter restoring the number of dimensions. That is, the calculation device 100 adds a new neuron to an auto encoder having a smaller number of neurons in neuron groups of the intermediate layer than the number of neurons contained in the input layer or the output layer.

In this manner, the calculation device 100 adds a new neuron to an autoencoder and performs optimization of new data; therefore, it is possible to easily acquire an autoencoder that appropriately extracts a feature of the new data.

4-4. Addition of New Neuron (4)

In the above described embodiment, an example has been described in which the calculation device 100 adds a single new neuron to a DNN. Meanwhile, the calculation device 100 may add at least one arbitrary number of new neurons, rather than a single new neuron, to a DNN. For example, the calculation device 100 adds a neuron group, which contains multiple new neurons and which learned a specific target, to a DNN.

In this manner, the calculation device 100 adds an arbitrary number of new neurons to a DNN. Consequently, the calculation device 100 can add each neuron group to a DNN; therefore, it is possible to utilize a neuron group that learned a specific target.

4-5. Addition of Coupling Coefficient

In the above described embodiment, an example has been described in which the calculation device 100 calculates coupling coefficients between a new neuron and upper-stage neurons located in the output layer side relative to a layer to which the new neuron is added among other neurons. Meanwhile, the calculation device 100 may calculate coupling coefficients between the new neuron and lower-stage neurons located in the input layer side relative to the layer to which the new neuron is added among other neurons, rather than the coupling coefficients between the new neuron and the upper-stage neurons.

For example, in the example in FIG. 1, the calculation device 100 calculates not only the coupling coefficients $W_{21}$ to $W_{n3}$ between the new neuron Np and the upper-stage neurons $N_{21}$ to $N_{n3}$, but also the coupling coefficient $W_{01}$ to $W_{03}$ between the new neuron Np and the neurons $N_{01}$ to $N_{03}$, which are lower-stage neurons located in the input layer side relative to a layer to which the new neuron Np is added.

In this manner, the calculation device 100 calculates coupling coefficients between a new neuron and lower-stage neurons located in the input layer side relative to a layer to which the new neuron is added among other neurons. Therefore, the calculation device 100 can acquire a DNN with high discrimination accuracy.

4-6. Calculation Process

In the above described embodiment, an example of the process performed by the calculation device 100 to calculate coupling coefficients between neurons contained in a DNN and a new neuron has been described. Meanwhile, the calculation device 100 may perform various processes in arbitrary orders, rather than the above described processing procedures.

For example, the calculation device 100 concurrently calculates coupling coefficients between neurons such that an error between an output result obtained when training data is input to a DNN and a correct output result with respect to the training data is minimized. An arbitrary method, such as quantum annealing, may be applied to such parallel processing.

In this manner, the calculation device 100 performs various processes in arbitrary orders. Therefore, the calculation device 100 can increase a processing speed.

Further, the calculation device 100 may generate a DNN that discriminates between various objects drawn in images, rather than clothes drawn in images. For example, the calculation device 100 generates a DNN capable of discriminating a feature of European people by adding a new node to a DNN that learned a feature of Asian people. An example of this will be described below.

For example, the calculation device 100 first accepts, as pieces of input data, multiple pieces of image data in which Asian people are drawn. Then, the calculation device 100 learns a feature of Asian people drawn in images. Accordingly, the calculation device 100 generates a DNN capable of distinguishing that an image contains an Asian person when accepting, as input data, image data in which the Asian person is drawn.

Thereafter, the calculation device 100 adds a new neuron to the trained DNN capable of discriminating Asian people. Subsequently, the calculation device 100 accepts, as pieces of input data, multiple pieces of image data in which European people are drawn. Then, the calculation device 100 adjusts coupling coefficients between neurons contained in the DNN so as to discriminate a feature of European people drawn in images. For example, the calculation device 100 corrects the coupling coefficients between the neurons by a backpropagation method. Accordingly, the calculation device 100 generates a DNN capable of discriminating the feature of European people.

That is, the calculation device 100 adds a new node to a DNN that has trained by using input data belonging to a subclass of "Asian people" contained in a class of "people", and corrects coupling coefficients between the new node and other nodes by using input data belonging to a subclass of "European people" contained in the class of "people". Consequently, the calculation device 100 can generate a DNN that extracts other features by using an existing DNN, and therefore can easily acquire the DNN as compared to a case where the DNN is newly generated.

Further, the output unit 134 may output feature amount vectors. Specifically, the output unit 134 outputs coupling coefficients between neurons as feature amount vectors. As one example, the output unit 134 outputs the coupling coefficients calculated by the calculation unit 133 as feature amount vectors indicating a feature of data. That is, the output unit 134 outputs the coupling coefficients between the new neuron added by the adding unit 131 and the other neurons as the feature amount vectors indicating a feature of data. Therefore, the calculation device 100 can utilize the feature amount vectors indicating a feature of data.

In this case, for example, the calculation device 100 calculates the coupling coefficients between nodes of a DNN, in which coupling coefficients for extracting a feature of data belonging to a predetermined class are set between multiple nodes, based on an output result obtained when data in a subclass belonging to the predetermined class is input. As one example, the calculation device 100 calculates coupling coefficients that minimize an error between an output result obtained when data in a subclass is input to a DNN and a correct output result with respect to the data in the subclass. Then, the calculation device 100 outputs the calculated coupling coefficients as feature amount vectors indicating a feature of the subclass.

4-7. DNN

In the above described embodiment, an example has been described in which the calculation device 100 adds a new neuron to a DNN formed of three layers. However, the calculation device 100 is not limited to the above example, and may add at least one new neuron to a DNN formed of an arbitrary number of layers. For example, the calculation device 100 adds a new neuron to a multi-stage DNN containing multiple neuron groups in an intermediate layer. Further, a neuron group contained in a DNN is not limited to the above example, and may be formed of an arbitrary number of neurons.

Furthermore, neurons contained in a DNN are not limited to the above example, and may be coupled to one another by various known conventional techniques. For example, neurons contained in a DNN may be coupled randomly.

4-8. Application Target

In the above described embodiment, an example has been described in which the calculation device 100 is applied to image recognition for discriminating objects drawn in the image data. However, the calculation device 100 may be applied to various recognitions rather than the image recognition. For example, the calculation device 100 is applied to speech recognition in which speech is targeted. Consequently, the calculation device 100 can discriminate speakers by inputting speech data as input data. For example, the calculation device 100 can discriminate sex, age, or the like of a speaker who has given a speech contained in the speech data.

In another example, the calculation device 100 is applied such that a stock price is targeted. Consequently, the calculation device 100 can discriminate pieces of information on a stock price by inputting time series data of stock prices or industrial sectors as input data. For example, the calculation device 100 can discriminate industrial sectors, can predict stock prices, or the like by discriminating movement of stock prices.

4-9. Others

Of the processes described in the embodiments, all or part of a process described as being performed automatically may also be performed manually. Alternatively, all or part of a process described as being performed manually may also be performed automatically by known methods. In addition, the processing procedures, specific names, and information including various types of data and parameters illustrated in the above-described document and drawings may be arbitrarily changed unless otherwise specified. For example, various types of information illustrated in the drawings are not limited to those illustrated in the drawings.

Further, the components of the devices illustrated in the drawings are functionally conceptual and do not necessarily have to be physically configured in the manner illustrated in the drawings. That is, specific forms of distribution and integration of the devices are not limited to those illustrated in the drawings, and all or part of the devices may be functionally or physically distributed or integrated in arbitrary units depending on various loads or use conditions. For example, the adding unit 131 and the accepting unit 132 illustrated in FIG. 2 may be integrated with each other.

4-10. Hardware Configuration

Figure 5:
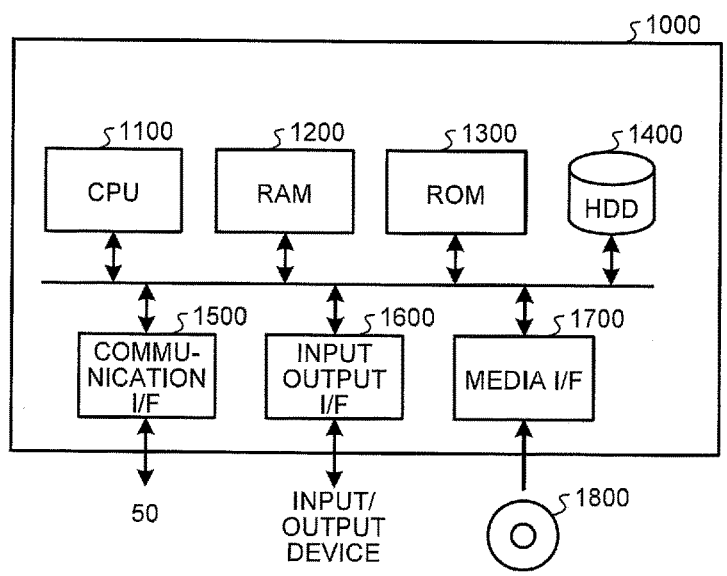
FIG. 5 is a hardware configuration diagram illustrating an example of a computer that implements functions of the calculation device.

The above described calculation device 100 according to the embodiment is realized by a computer 1000 as illustrated in FIG. 5 for example. Hereinafter, the calculation device 100 will be described as an example. FIG. 5 is a hardware configuration diagram illustrating an example of the computer 1000 that implements the functions of the calculation device 100. The computer 1000 includes a CPU 1100, a RAM 1200, a ROM 1300, an HDD 1400, communication interface (I/F) 1500, an input output interface (I/F) 1600, and a media interface (I/F) 1700.

The CPU 1100 operates based on programs stored in the ROM 1300 or the HDD 1400, and controls each unit. The ROM 1300 stores therein a boot program executed by the CPU 1100 when the computer 1000 is activated, a program dependent on the hardware of the computer 1000, or the like.

The HDD 1400 stores therein a program executed by the CPU 1100 and data or the like used by the program. The communication interface 1500 receives data from other devices via a communication network 50, sends the data to the CPU 1100, and transmits data generated by the CPU 1100 to other devices via the communication network 50.

The CPU 1100 controls an output device, such as a display or a printer, and an input device, such as a keyboard or a mouse, via the input output interface 1600. The CPU 1100 acquires data from the input device via the input output interface 1600. Further, the CPU 1100 outputs generated data to the output device via the input output interface 1600.

The media interface 1700 reads programs and data stored in a recording medium 1800, and provides them to the CPU 1100 via the RAM 1200. The CPU 1100 loads the programs from the recording medium 1800 onto the RAM 1200 via the media interface 1700, and executes the loaded programs. The recording medium 1800 is, for example, an optical recording medium such as a digital versatile disc (DVD) or a phase change rewritable disk (PD), a magneto-optical recording medium such as a magneto optical (MO) disk, a tape medium, a magnetic recording medium, a semiconductor memory, or the like.

For example, when the computer 1000 functions as the calculation device 100 according to the embodiment, the CPU 1100 of the computer 1000 executes the programs loaded on the RAM 1200, to thereby realize the functions of the control unit 130. Further, the HDD 1400 stores therein data stored in the storage unit 120. The CPU 1100 of the computer 1000 reads the programs from the recording medium 1800 and executes the programs; however, as another example, the programs may be acquired from the other devices via the communication network 50.

5. Advantageous Effects

As described above, the calculation device 100 according to the embodiment includes the adding unit 131, the accepting unit 132, and the calculation unit 133. The adding unit 131 adds a new node to a network, which has multiple nodes that output results of calculations on input data are connected and that learned a feature of data belonging to a first subclass contained in a predetermined class. The accepting unit 132 accepts, as input data, training data belonging to a second subclass contained in the predetermined class. The calculation unit 133 calculates coupling coefficients between the new node added by the adding unit 131 and other nodes to learn a feature of the training data belonging to the second subclass based on an output result obtained when the training data accepted by the accepting unit 132 is input to the network.

Further, in the calculation device 100 according to the embodiment, the calculation unit 133 calculates coupling coefficients that minimize an error between the output result obtained when the training data is input to the network and a correct output result corresponding to the data.

Furthermore, in the calculation device 100 according to the embodiment, the calculation unit 133 calculates the coupling coefficients between the new node added by the adding unit 131 and the other nodes, coupling coefficients that minimize the error, in order from a coupling coefficient with respect to a node located closest to the output layer among the nodes contained in the network.

Therefore, the calculation device 100 can extract a feature of data by using an existing DNN, and therefore can easily acquire the DNN capable of discriminating the feature of the data. For example, the calculation device 100 can acquire a DNN capable of discriminating a feature of the clothes manufactured by the C company by using a DNN that learned a feature of the clothes manufactured by the A company; therefore, it is possible to easily acquire the DNN as compared to a case where the DNN is newly generated. Further, the calculation device 100 uses a DNN that has already learned a certain features, and therefore can acquire a DNN capable of discriminating a feature of data with a smaller number of pieces of training data as compared to a case where the DNN is newly generated. Consequently, the calculation device 100 can reduce effort to collect pieces of the training data and reduce time to learn data.

Furthermore, in the calculation device 100 according to the embodiment, the output unit 134 outputs the coupling coefficients calculated by the calculation unit 133 as feature amount vectors.

Therefore, the calculation device 100 according to the embodiment can utilize the feature amount vectors indicating a feature of data.

Moreover, in the calculation device 100 according to the modified example, the calculation unit 133 calculates coupling between the new node added by the adding unit and the other nodes, that minimize the error, with stabilizing coupling coefficients between the other nodes other than the new node.

Therefore, the calculation device 100 according to the modified example can easily acquire a DNN capable of discriminating a feature of data. That is, the calculation device 100, by coupling the new node and the other nodes, can optimize the contents of determination of the trained DNN with respect to data of a new class. Consequently, the calculation device 100 can easily acquire a DNN capable of discriminating a feature with a smaller number of pieces of data.

Furthermore, in the calculation device 100 according to the modified example, the adding unit 131 adds a new node by setting coupling coefficients between the new node and nodes contained in a network to initial values that do not influence to an output result.

Consequently, the calculation device 100 according to the modified example can reduce the influence of addition of the new neuron; therefore, it is possible to calculate coupling coefficients according to an error in a wrong output result.

While the embodiments of the present invention have been explained in detail above based on the drawings, the embodiments are described by way of example, and the present invention may be embodied in various other forms with various changes or modifications based on knowledge of person having ordinary skill in the art, in addition to the embodiments described in this specification.

According to an embodiment of the present invention, it is possible to easily acquire a DNN.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A calculation device comprising:
a processor programmed to:
add at least one new node to a network, that connects multiple nodes that output results of calculations on input data and which learned a feature of data belonging to a first subclass contained in a predetermined class;
accept, as input data, training data belonging to a second subclass contained in the predetermined class;
calculate coupling coefficients between the added new node and other nodes to learn a feature of the training data belonging to the second subclass based on an output result to be obtained when the accepted training data is input to the network in such a manner that an error between the output result obtained when the training data is input to the network and a correct output result corresponding to the training data is minimized while stabilizing coupling coefficients between other nodes; and
accept data for processing; and
process the accepted data for processing using the network to identify the processed data containing a feature belonging to the second subclass.

2. The calculation device according to claim 1, wherein the processor is programmed to calculate coupling coefficients between the added new node and the other nodes, that minimize the error, with stabilizing coupling coefficients between the other nodes.

3. The calculation device according to claim 1, wherein the processor is programmed to calculate the coupling coefficients between the added new node and the other nodes, that minimize the error, in order from a coupling coefficient with respect to a node located closest to an output layer among nodes contained in the network.

4. The calculation device according to claim 1, wherein the processor is programmed to add the new node to the network by setting the coupling coefficients between nodes contained in the network and the new node to initial values that do not influence to the output result.

5. The calculation device according to claim 1, wherein:
the processor is programmed to output a network, to which the new node is added and in which coupling coefficients between each of nodes are set to the calculated coupling coefficients.

6. A calculation method implemented by a calculation device, the calculation method comprising:
adding at least one new node to a network that connects multiple nodes that output results of calculations on input data and which learned a feature of data belonging to a first subclass contained in a predetermined class;
accepting, as input data, training data belonging to a second subclass contained in the predetermined class;
calculating coupling coefficients between the new node added at the adding and other nodes to learn a feature of the training data belonging to the second subclass based on an output result to be obtained when the training data accepted at the accepting is input to the network; and
accepting data for processing; and
processing the accepted data for processing using the network to identify the processed data containing a feature belonging to the second subclass.

7. A non-transitory recording medium storing a calculating program causing a computer to execute a calculating process, the calculating process comprising:

adding at least one new node to a network that connects multiple nodes that output results of calculations on input data and which learned a feature of data belonging to a first subclass contained in a predetermined class;

accepting, as input data, training data belonging to a second subclass contained in the predetermined class;

calculating coupling coefficients between the new node added at the adding and other nodes to learn a feature of the training data belonging to the second subclass based on an output result to be obtained when the training data accepted at the accepting is input to the network; and accepting data for processing; and processing the accepted data for processing using the network to identify the processed data containing a feature belonging to the second subclass.

8. A calculation device comprising:

a processor programmed to:

access a neural network, the accessed neural network having multiple connected nodes, each of the connected nodes having a coupling coefficient, the coupling coefficients having been set so that the accessed neural network has learned a feature of data belonging to a first subclass contained in a predetermined class and outputs results of calculations on input data;

add at least one new node to the accessed network;

input training data belonging to a second subclass contained in the predetermined class;

based on (i) the input training data and (ii) an output result predicted to be obtained when the input training data is processed by the accessed neural network, modify the accessed neural network by calculating coupling coefficients between the added new node and other nodes, the calculated coupling coefficients causing the accessed neural network to learn a feature of the input training data belonging to the second subclass, an amount of the input training data being less than an amount of training data necessary to newly create a neural network that has learned the feature belonging to the second subclass;

accept data for processing; and process the accepted data using the modified neural network to automatically identify the processed data containing the input feature belonging to the second subclass.

* * * * *